United States Patent [19]

Alexandrov et al.

[11] Patent Number: 4,711,182
[45] Date of Patent: Dec. 8, 1987

[54] MAGNETIC SUSPENSION FOR A VEHICLE

[76] Inventors: Adolf M. Alexandrov, ulitsa Chelyabinskaya, 19, korpus 4, kv. 457, Moscow; Evgeny G. Vasiliev, ulitsa Novogireevskaya, 6, kv. 13, Moskovskaya oblast, Reutovo; Alexandr A. Iskanderov, ulitsa, 7, kv. 20, Bashilovskaya, Moscow; Vladimir S. Magdenko, ulitsa Vinokurova, 16, kv. 23, Moscow; Semen G. Melikov, Yasenevo, mikroraion, 9, korpus 64, kv. 592, Moscow; Eduard R. Avsharov, ulitsa Solnechnaya, 11, kv. 94, Moskovskaya oblast, Odintsovo; Jury A. Tsimbler, Sojuzny prospekt, 10, kv. 261, Moscow; Vladimir I. Presnyakov, ulitsa Gagarina, 22, kv. 17, Moskovskaya oblast, Orekhovo-Zuevo, all of U.S.S.R.

[21] Appl. No.: 727,272

[22] Filed: Apr. 25, 1985

[51] Int. Cl.[4] ............................................. B60L 13/04
[52] U.S. Cl. ..................................... 104/283; 104/91; 104/286
[58] Field of Search .................. 104/91, 281, 89, 283, 104/286

[56] References Cited

U.S. PATENT DOCUMENTS

| 3,828,686 | 8/1974 | Steenbeck et al. | 104/283 |
| 3,885,504 | 5/1975 | Baermann | 104/283 |
| 3,951,074 | 4/1976 | Cooper | 104/283 |
| 4,324,185 | 4/1982 | Vinson | 104/283 |

FOREIGN PATENT DOCUMENTS

| 2235166 | 2/1974 | Fed. Rep. of Germany | 104/283 |
| 2228650 | 5/1973 | France | 104/283 |
| 627002 | 1/1976 | U.S.S.R. | 104/281 |
| 464469 | 3/1979 | U.S.S.R. | |

Primary Examiner—Robert B. Reeves
Assistant Examiner—Glenn B. Foster
Attorney, Agent, or Firm—Lilling & Greenspan

[57] ABSTRACT

A magnetic suspension for a vehicle, includes a guide rail vertically mounted on a track and an underframe having a magnetic system surrounding lateral sides of the guide rail on which are mounted strips of permanent magnets. The magnetic system of the underframe also comprises strips of permanent magnets installed on the lateral sides of the underframe facing toward the guide rail, the strips of permanent magnets being installed with a spacing equal to the spacing of the strips of the guide rail, and the polarities of pole facets of the strips facing toward one another being different.

16 Claims, 6 Drawing Figures

MAGNETIC SUSPENSION FOR A VEHICLE

BACKGROUND OF THE INVENTION

1. Field of the Invention

The invention relates to transportation engineering, and, in particular, it deals with a magnetic suspension for a vehicle designed for passenger and freight transportation.

2. Description of the Prior Art

Known in the art are magnetic suspensions wherein an underframe of a vehicle moves along a guide rail horizontally extending on a track, and an air gap is provided between cooperating members of the magnetic suspension, e.g. between magnetic poles of the underframe and guide rail, owing to the mutual repulsion of magnets of the underframe and guide rail, respectively.

However, during the movement, the air gap changes during vertical oscillations of the vehicle underframe under the action of various perturbances thus endangering the movement. For this reason, the air gap between the cooperating members of the magnetic suspension should be increased resulting in an increased energy consumption and weight of the magnets. In addition, the surfaces of magnetic strips of the suspension which are installed on the track are prone to fouling with foreign objects and atmospheric precipitates so that there is an added cost of track cleaning and inspection. These are the main factors hampering wide application of magnetic suspensions for vehicles with horizontally extending guide rails.

Magnetic suspensions with vertically extending cooperating members appear to be more promising. With such an arrangement, all of the vertical oscillations of the underframe with respect to the track would not result in a change in the gap between the cooperating members of the magnetic suspension, the gap remaining substantially constant. Such magnetic suspensions are not prone to fouling with foreign objects and atmospheric precipitates as they cannot hold on the guide rail.

The air gap which does not depend on oscillations of the underframe and the immunity of such magnetic suspensions to fouling enables one to reduce the gap between the surfaces of the cooperating members as compared to the above structures so that the load carrying capacity of a vehicle can be increased.

Among such magnetic suspensions is a magnetic suspension disclosed in U.S. Pat. No. 3,828,686. The magnetic suspension comprises guide rails made of a ferromagnetic material and installed on the track, and an electrical winding mounted on the underframe of a vehicle and on a core vertically extending between guide rails.

This magnetic suspension does not, however, have reliability which would be adequate for transportation purposes, since an interruption of power supply of the electrical winding results in the loss of lifting force of the suspension and in accidents. In addition, the magnetic suspension of this type requires a high accuracy of the relative position of the guide rails and core since a sufficient stability (gradient) of lifting force cannot be achieved within the actually occurring range of vertical displacements of the vehicle underframe.

The closest prior art of the invention is a magnetic suspension of a vehicle (cf. USSR Inventor's Certificate No. 464469, Cl. B21B, 1982), comprising a guide rail vertically installed on the track and having lateral sides of a magnetically conducting material, and an underframe surrounding the lateral sides of the guide rail and having a magnetic system in the form of horizontally extending strips of magnets, the polarity of the pole facets of the magnets facing toward the lateral sides of the guide rail alternating in the vertical direction. The magnetic system also comprises a means for lateral stabilization of the underframe preventing it from asymmetrically displacing with respect to the guide rail. The magnets of the underframe create magnetic fluxes that close at teeth provided on the lateral side of the guide rail. During a vertical displacement of the vehicle underframe, the lifting force of the suspension passing through its maximum will decrease to zero when the teeth of the guide rail will be disposed symmetrically with respect to two adjacent pole facets of the electromagnet, i.e. the zone of admissible vertical displacements of the vehicle underframe should be smaller than one half the distance between adjacent pole facets of the magnets of the vehicle underframe so that the amount of admissible vertical displacements of the underframe is limited and high accuracy is required in the manufacture of the guide rail so as to ensure the desired stability of a vehicle. In addition, in the magnetic suspension of this type, it is necessary to ensure a high magnitude of magnetizing force of the magnets since magnetic flux created by the magnets of the underframe is closed through two air gaps. These circumstances discourage the use of permanent magnets in the magnetic suspension as sources of magnetic field, since a magnetizing force of permanent magnets in such a suspension remains inadequate for building-up the necessary lifting force. Such magnetic suspension can only be built with electromagnets that feature high energy consumption and require many non-ferrous metals for their manufacture while, at the same time, lacking reliability because an interruption of power supply results in disappearance of lifting force and in emergency situations.

SUMMARY OF THE INVENTION

It is an object of the invention to increase load carrying capacity of the magnetic suspension, improve its stability and reliability in operation with a concurrent reduction of metal weight and energy consumption.

The above problem is solved by a magnetic suspension for a vehicle, comprising at least one guide rail installed vertically on the track and having lateral sides of a magnetically conducting material, an underframe having a means for stabilizing its lateral position and surrounding the lateral sides of the guide rail, and a magnetic system having horizontally extending pole facets, the polarities of the pole facets facing toward the lateral sides of the guide rail alternating in the vertical direction. According to the invention, the magnetic system of the underframe is made of strips of permanent magnets installed horizontally on the lateral sides of the guide rail, the spacing of the strips being identical to the spacing of the strips of permanent magnets of the underframe, the polarities of the pole facets of the latter strips and the polarities of the pole facets of the strips of the guide rail facing toward them being different.

In a magnetic suspension for a vehicle according to the invention, the strips of permanent magnets of the underframe are preferably installed on substrates of a magnetically conducting material and the underframe preferably comprises at least one rigid bracket.

The magnetic suspension according to the invention may have at least one auxiliary guide rail having strips of permanent magnets, the underframe having substrates of a magnetically conducting material on which are mounted strips of permanent magnets. The substrates disposed on the outer sides of the guide rails are rigidly connected to the vertical ribs of the rigid bracket of the underframe, and the substrates of the strips of magnets disposed between the guide rails are secured to the base of the rigid bracket.

According to the invention, the magnetic suspension may be made in such a manner that one guide rail is rigidly mounted on the track and the other guide rails are installed on the track for lateral displacements.

The magnetic suspension accorfding to the invention may also comprise plates of a non-magnetic electrically conducting material installed on the guide rail on the pole facets of the strips of permanent magnets facing toward the vehicle underframe.

In the magnetic suspension according to the invention the permanent magnets forming the strips of the guide rail and underframe are preferably made in the form of bars of a magnetically hard material.

The magnetically hard material used in the magnetic spension according to the invention is preferably a ferrite.

The above described features of the magnetic suspension for a vehicle make it possible to increase the a amplitude of its admissible vertical oscillations thereby improving stability of the suspension.

At the same time, the magnetic suspension according to the invention offers the possibility of the practical application of permanent magnets which do not require electrical power supply so that reliability of the magnetic suspension in operation is improved and safety of its operation ensured.

The invention is also advantageous in a lower metal weight of the suspension since non-ferrous metals are not used for making electrical windings, and consumption of magnetically conducting materials for the manufacture of the guide rail is also reduced.

DETAILED DESCRIPTION OF THE INVENTION

Figure 1:
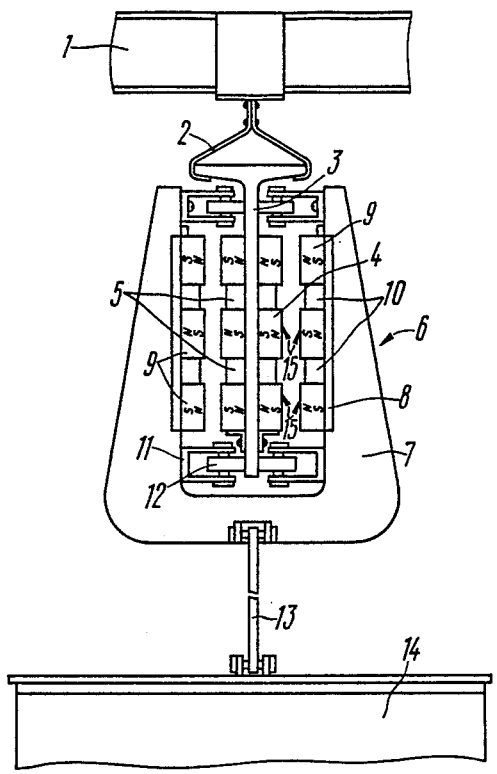
FIG. 1 is a cross-sectional view of a magnetic suspension for a vehicle according to the invention.

From a track 1 (FIG. 1), by means of clamps 2, is suspended a steel guide rail 3. Horizontally extendimg parallel strips 4 of permanent magnets are secured to the lateral sides of the guide rail 3. Non-magnetic spacers 5 are provided between the strips 4 to facilitate assembly of the guide rail 3. An udnerframe 6 of the magnetic suspension comprises a rigid brtacket 7 surrounding the lateral sides of the guide rail 3. Substrates 8 of a magnetically conducting material are secrured to the rigid bracket 7, and horizontally extending parallel strips 9 of permanent magnets alternating with non-magnetic inserts 10 are installed on the substrates. A means for lateral stabilization of the underframe 6 is also mounted on the rigid bracket 7 and comprises mounting arms 11 in which are mounted rollers 12 running along the lateral sides of the guide rail 3. A pullrod 13 is used for suspending a load container 14 from the rigid bracket 7 of the underframe 6. The strips 4 of permanent magnets of the guide rail 3 and the strips 9 of permanent magnets of the underframe 6 are identically vertically spaced and disposed opposite to one another. Polarities of the pole facets 15 of the strips 4 and 9 of permanent magnets alternate in the vertical direction, the polarities of the pole facets 15 (FIG. 2) of opposite strips 4 and 9 of permanent magnets being different.

In the magnetic suspension according to the invention, the strips 4 and 9 are formed bvy permanent magnets in the form of bars of a magnetically hard material such as ferrite, so as to dispense with power supply. This facility makes it possible to avoid emergency situations otherwise unavoidable upon interruptions of power supply.

In addition, the consumption of metal for the manufacture of the guide rail and magnets is reduced as they do not require an electrical winding made of nonferrous metals, and the guide rail 3 does not have metal teeth.

Figure 3:
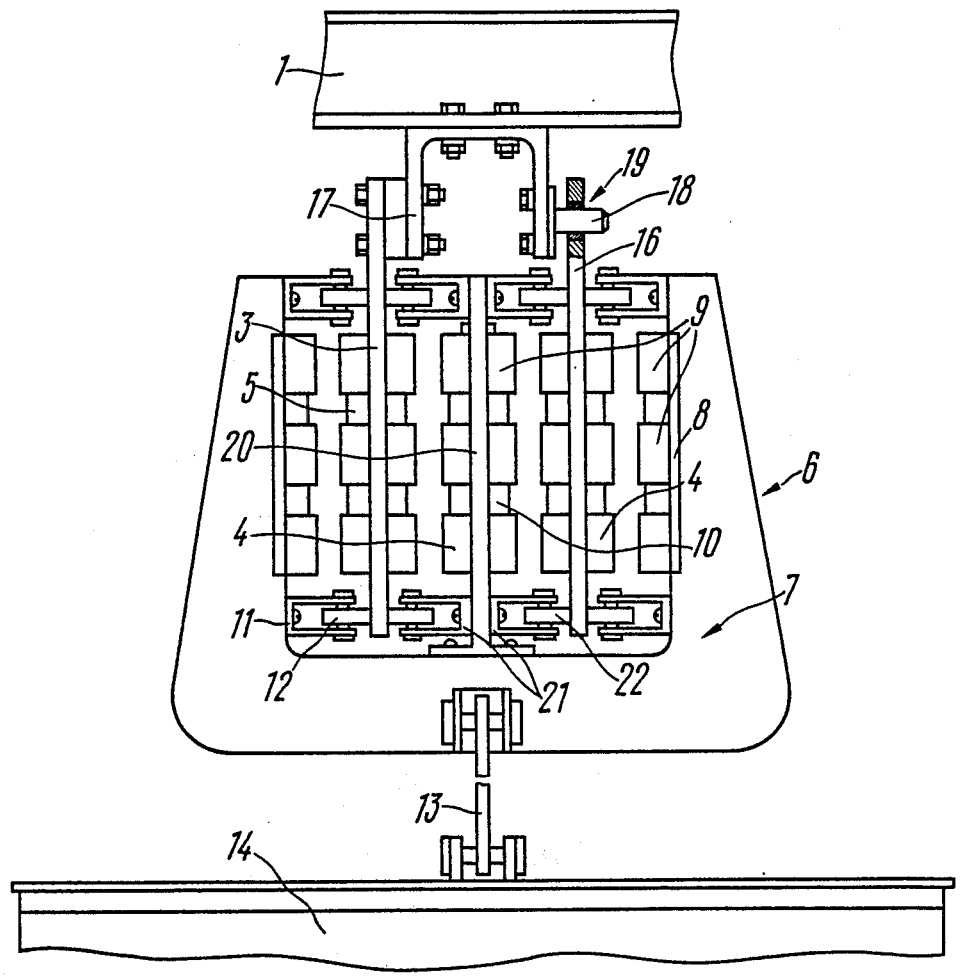
FIG. 3 is a cross-sectional view of another embodiment of the magnetic suspension having two guide rails according to the invention.

FIG. 3 shows another embodiment of the magnetic suspension having two guide rails 3 and 16 installed on the track 1 by means of mounting arms 17. The guide rail 3 is rigidly mounted on the arms 17 and the auxiliary rail 16 is installed on the track for lateral displacements which is achieved by a mounting structure of the arms 17 having pins 18 received in holes 19 of the guide rail 16.

The underframe 6 of a vehicle comprises a rigid bracket 7. The strips 9 of permanent magnets are mouted on the substrates 8 rigidly secured to the vertical walls of the rigid bracket 7 facing toward the outer sides of the guide rails 3 and 16. Another substrate 20 disposed between the guide rails 3 and 16 has its end face portion secured to the base of the rigid bracket 7. The strips 4 and 9 of permanent magnets, are secured, with the interposition of the non-magnetic spacers 5 and 10, to the lateral sides of the guide rails 3 and 16 and also to the substrates 8 and 20 of the underframe 6. The arrangement and polarities of the strips 4 and 9 on the guide rails 3 and 16 and underframe 6 are similar to those of the embodiment shown in FIG. 1.

A means for stabilizing this magnetic suspension (FIG. 3) comprises arms 11 having rollers 12 which are installed on the rigid bracket 7 and run along the outer lateral sides of the guide rails 3 and 16, and arms 21 mounted on the substrate 20 and having rollers 22 running along the inner lateral sides of the guide rails 3 and 16.

The embodiment of the magnetic suspension makes it possible to increase its load carrying capacity whereas the weight of the underframe 6 is only slightly increased because the substrate 20 is thin and the requirements imposed ujpon its rigidity are much lower than those imposed upon rigidity of the bracket 7.

The provision of the laterally displaceable guide rail 16 facilitates installation of the magnetic suspension as a whole, and the desired distance between the guide rails 3 and 16 is self-adjusted during movement of the underframe 6.

Figure 5:
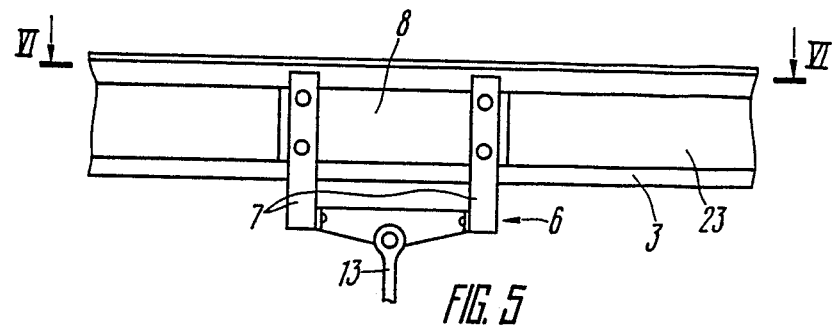
FIG. 5 is a side elevation view of the underframe and guide rail according to the invention.
Figure 6:
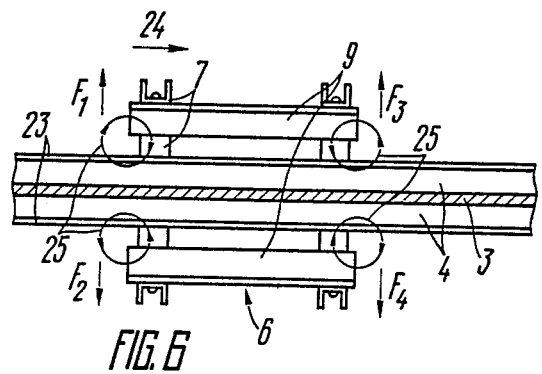
FIG. 6 is a cross sectional view taken along line VI—VI in FIG. 5.
Figure 4:
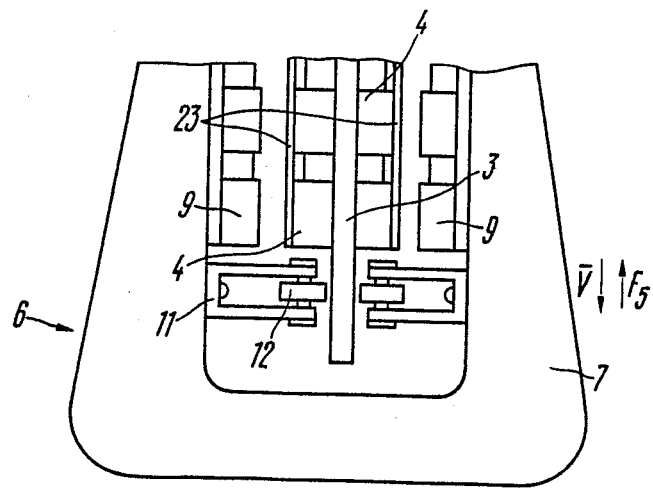
FIG. 4 is an enlarged view of the underframe adjacent to a portion of the guide rail covered with non-magnetic electrically conducting plates according to the invention.

FIGS. 4-6 show still another embodiment of the magnetic suspension. Here the strips 4 of permanent magnets mounted on the guide rail 3 are covered with plates 23 of a non-magnetic electrically conducting material which ensure an improved stability of the magnetic suspension at high speeds. In other respects the construction of the magnetic suspension is similar to that shown in FIG. 1.

FIG. 5 shows a side elevational view of the underframe 6 consisting of two rigid brackets 7 to which is rigidly secured the substrate 8 and the guide rail 3 having plates 23 of a non-magnetic electrically conducting material installed thereon.

FIG. 6 is a sectional view taken along line VI—VI in FIG. 5. It is clearly seen in this Figure that the strips 4 and 9 of permanent magnets are made in the form of bars mounted on the guide rail 3 and underframe 6. The strips 4 are covered with the plates 23 of a non-magnetic electrically conducting material.

The magnetic suspension according to the invention functions in the following manner.

During loading of the container 14 (FIG. 1) the underframe 6 moves down under gravity. During the vertical displacement of the underframe 6 of the vehicle, the strips 9 of permanent magnets of the underframe 6 will move down relative to the opposite strips 4 of permanent magnets disposed on the guide rail 3.

The interaction of the opposite strips 9 and 4 moving vertically relative to one another will create a lifting force caused by their attraction owing to the opposite polarities of their pole facets 15.

Each strip 9 of the underframe 6, except the bottom ones, will also interact with the underlying strip 4 of the guide rail 3 having a like polarity of the pole facet 15 which it will approach as the underframe 6 moves down. This interaction of the strips 9 and 4 will also create a lifting force caused by their repulsion. The total lifting force will make up for the vertical load applied to the underframe 6 under gravity of the vehicle. Forces of lateral attraction of the strips 4 and 9 acting on either side of the guide rail 3 are taken up by the rigid bracket 7 so that a load equal to the difference between forces of attraction of the strips 9 toward the strips 4 on either lateral side of the guide rail will act upon the rollers 12 of the stabilizing means.

The rollers 12 of the stabilizing means will provide for the equality of clearances between the strips 9 and 4 on either side of the guide rail 3. The closer the amounts of clearances to each other, the lower is the load on the rollers 12 and the resistance to movement of the underframe 6. As the vertical displacement of the underframe 6 downward increases, the lifting force of the magnetic suspension becomes greater and achieves its maximum when the displacement of the underframe 6 is equal to one half the spacing of the strips 4 and 9.

Figure 2:
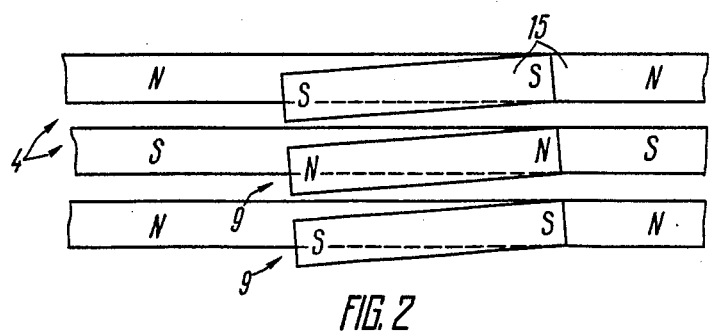
FIG. 2 is a diagrammatic view illustrating the position of horizontally extending strips of permanent magnets on the guide rail and on one side of the vehicle underframe according to the invention.

In case there are perturbing forces causing pitching (galloping) of the underframe 6, the strips 4 and 9 get out of parallelism with one another (see Figure 2). As certain magnetic strips 4 and 9 facing toward each other with opposite pole facets 15 will tend to take a position when they would run in parallel with each other and other strips 4 and 9 facing toward each other with their like pole facets will move apart, a moment is built-up which opposes the pitching (galloping) of the underframe 6 which, along with an increase in the admissible vertical displacement of the underframe 6, prevents it from losing stability.

The magnetic suspension shown in FIG. 3 functions in just the same manner as described above. The particular feature of this embodiment resides in an increased number of cooperating strips 9 and 4 to increase the load carrying capacity of the magnetic suspension which is achieved by the provision of another guide rail 16 rather than by increasing the number of strips 4 of the guide rail 3 because such an increase would have resulted in a larger vertical dimension of the guide rail 3 and underframe 6. This way of increasing the load carrying capacity would have required an improved accuracy in making the rail 3 and resulted in an increased weight of the underframe 6. Contrary to this, in this embodiment of the magnetic suspension the substrate 20, which is a load bearing member of the underframe 6, does not take-up bending forces as the strips 9 are installed on either side thereof and forces of lateral attraction of the strips 9 acting on either side of the substrate 20 compensate for each other. Therefore, the substrates 20 may have minimum possible rigidity in the horizontal direction unlike the rigid bracket 7.

Another feature of the magnetic suspension is that the guide rail 16 is mounted for lateral displacements. This facility makes it possible to ensure self-adjustment of the rail 16 with respect to the rail 3 during movement of the underframe 6 when the suspension is installed so that requirements imposed upon accuracy of assembly can be lower.

The magnetic suspension shown in FIGS. 4, 5 and 6 functions in the same manner as described above. The distinction in this case is that non-magnetic electrically conducting plates 23 are provided on the strips 4 to ensure lateral stability of the underframe 6 at high speeds without the rollers 12 engaging the guide rail 3. When the underframe 6 (FIG. 6) moves at a high speed (the direction of movement is shown by arrow 24) magnetic fields alternating in magnitude (see arrows 25) are induced in the front and rear end faces of the underframe 6 to penetrate the non-magnetic electrically conducting plates 23 and induce eddy currents therein which, in cooperation with the strips 9, will cause electrodynamic repulsion of the end faces of the underframe 6 from the lateral sides of the guide rail 3 under the action of forces $F_1$, $F_2$, $F_3$, $F_4$ so as to stabilize the lateral position of the underframe 6.

During vertical oscillations of the underframe 6, magnetic flux created by the strips 9 and 4 and penetrating the plates 23 will change in magnitude. Eddy currents are thus induced in the plates 23 to interact with the strips 9 of the underframe 6 so as to build-up a force $F_5$ (FIG. 4) which is directed opposite to the vector $\vec{V}$ of velocity of vertical oscillations of the underframe 6.

Therefore, the force $F_5$ will suppress vertical oscillations of the underframe 6 thus enhancing its stability.

The invention makes it possible to improve reliability of the magnetic suspension of a vehicle in operation and to increase its stability and load carrying capacity while reducing metal weight and facilitating assembly.

This construction of the magnetic suspension makes it possible to use permanent magnets which do not require power supply thus bringing down operation cost and improving safety whereby the field of application of the magnetic suspension is substantially enlarged.

What we claim is:
1. A magnetic suspension for a vehicle for passenger and freight transportation along a track, comprising:

at least one guide rail vertically installed on the track, and having lateral sides of a magnetically conducting material;

an underframe surrounding said lateral sides of said guide rail and having a magnetic system;

a means for laterally stabilizing the position of said underframe;

first strips of permanent magnets extending in a longitudinal direction along the guideway, said first strips comprising a plurality of strips having pole facets which are arranged in an alternating polarity configuration in a vertical array;

second strips of permanent magnets extending in a substantially longitudinal direction of the vehicle, said second strips comprising a plurality of strips having pole facets which are arranged in an alternating polarity configuration in a vertical array;

said pole facets of said first strips having identical vertical spacing as said pole facets of said second polarity of the two sets of strips of permanent magnets interact to prevent excessive vertical displacement of the vehicle due to the proximity of the magnets to magnets of the opposite set of strips having the same polarity, the pole facets of said first and second strips which are horizontally spaced from each other having opposing polarity.

whereby the alternating polarity of the two sets of strips of permanent magnets interact to prevent excessive vertical displacement of the vehicle due to the proximity of the magnets to magnets of the opposite set of strips having the same polarity.

2. A magnetic suspension according to claim 1, wherein;

said underframe comprises at least one rigid bracket having substrates of a magnetically conducting material, said second strips of permanent magnets being mounted on said substrates.

3. A magnetic suspension according to claim 2 wherein the suspension further comprises at least two guide rails having said first strips of permanent magnets installed in a substantially horizontally superposed relationship with one another;

a second substrate of a magnetically conducting material installed on said underframe between said guide rails; and third strips of permanent magnets installed in a substantially horizontally superposed relationship with one another on the lateral sides of said second substrate with a spacing identical to the spacing of said first strips of permanent magnets of said guide rails, said third strips of permanent magnets mounted on said second substrate having pole facets with polarities thereof alternating in a vertical direction, said polarities of said pole facets of said third strips of permanent magnets of said substrate and said first strips of magnets of said guide rails facing toward one another and disposed opposite to each other being different.

4. A magnetic suspension according to claim 3, wherein said guide rails being arranged whereby one of said guide rails being rigidly mounted on the track and a second guide rail being laterally displaceable.

5. A magnetic suspension according to claim 1 further comprising plates of a non-magnetic electrically conducting material, said plates being installed on said pole facets of said first strips of permanent magnets of said guide rail facing toward said underframe.

6. A magnetic suspension according to claim 2 further comprising plates of a non-magnetic electrically conducting material, said plates being installed on said pole facets of said first strips of permanent magnets of said guide rail facing toward said bracket of the underframe.

7. A magnetic suspension according to claim 4 further comprising plates of a non-magnetic electrically conducting material, said plates being installed on said pole facets of said strips of permanent magnets of the guide rails facing toward said substrate and said bracket of the underframe.

8. A magnetic suspension according to claim 4 wherein said plates of a non-magnetic electrically conducting material being installed on said pole facets of said first strips of permanent magnets of the guide rails facing toward said underframe.

9. A magnetic suspension according to claim 1, wherein said first and second strips of permanent magnets being made in the form of bars of a magnetically hard material.

10. A magnetic suspension according to claim 2 wherein said first and second strips of permanent magnets being made in the form of bars of a magnetically hard material.

11. A magnetic suspension according to claim 3, wherein said first, second and third strips of permanent magnets being made in the form of bars of a magnetically hard material.

12. (Amended) A magnetic suspension according to claim 6, wherein said first and second strips of permanent magnets being made in the form of bars of a magnetically hard material.

13. A magnetic suspension according to claim 9, wherein said magnetically hard material is a ferrite.

14. A magnetic suspension according to claim 10, wherein said magnetically hard material is a ferrite.

15. A magnetic suspension according to claim 11, wherein said magnetically hard material is a ferrite.

16. A magnetic suspension according to claim 12, wherein said magnetically hard material is a ferrite.

* * * * *